O. BRIEDE.

MANUFACTURE OF TUBES.

APPLICATION FILED JUNE 14, 1912.

Reissued Oct. 8, 1912.

13,473.

WITNESSES:

J. Hebert Bradley

Thomas Boyce

INVENTOR

Otto Briede by Damon S. Wolcott

UNITED STATES PATENT OFFICE

OTTO BRIEDE, OF BENRATH, GERMANY, ASSIGNOR TO EMIL WINTER, OF PITTSBURGH, PENNSYLVANIA.

MANUFACTURE OF TUBES.

13,473. Specification of Reissued Letters Patent. Reissued Oct. 8, 1912.

Original No. 914,333, dated March 2, 1909, Serial No. 277,396. Application for reissue filed June 14, 1912. Serial No. 703,767.

*To all whom it may concern:*

Be it known that I, OTTO BRIEDE, residing at Benrath, in the Province of the Rhine and Kingdom of Prussia, Germany, a citizen of the Kingdom of Prussia and Empire of Germany, have invented or discovered certain new and useful Improvements in the Manufacture of Tubes, of which improvements the following is a specification.

The object of the present invention is to provide for a reduction of the area of contact of the billet on the mandrel by pushing one side of the billet away from the mandrel by a reducing and elongating action on the opposite side of the billet.

It is a further object of the invention to provide for such a distribution of the areas of contact of the billet on the mandrel caused by the rolls, as will insure the proper regulation of the speed of the mandrel.

Figure 1:
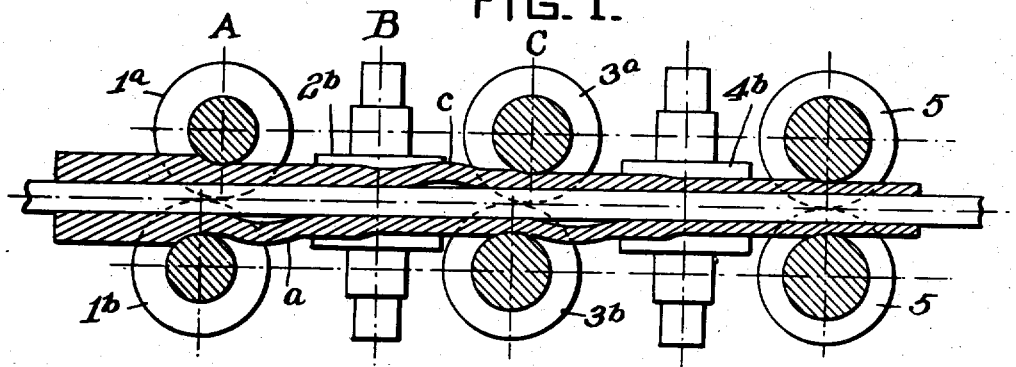
Figure 1A:
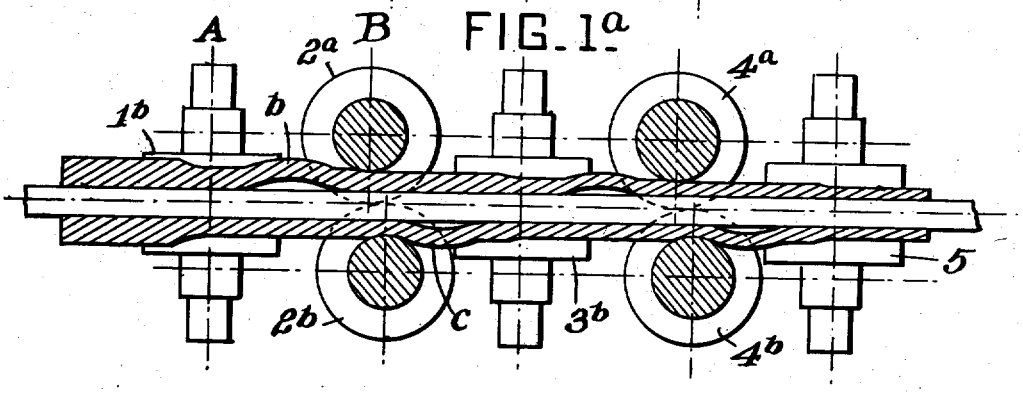
Figure 3:
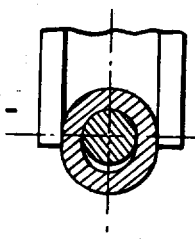
Figure 4:
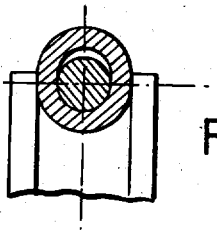
Figure 2:
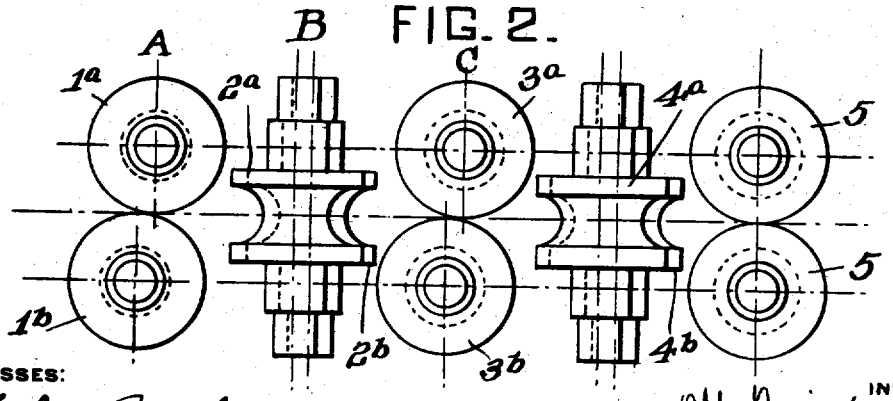

In the accompanying drawing forming a part of this specification, Figure 1 is a sectional view of a train of rolls embodying my improvement; Fig. $1^a$ is also a sectional view of said rolls but in a plane at an angle of 90 degrees from the section shown in Fig. 1. Fig. 2 illustrates the arrangement of the rolls. Figs. 3 and 4 are detail views illustrating the sizes of the grooves in the rolls relative to the billet operated on and also illustrating the action of the rolls on the billet.

In the practice of my invention a series of stands or pairs A. B. C. of rolls $1^a$, $1^b$, $2^a$, $2^b$, $3^a$, $3^b$, etc., are arranged for continuous action, *i. e.*, at such a distance apart that the billet will be caught by one pair of rolls before it is freed from the preceding pair. Alternate rolls are arranged with their axes at an angle, preferably a right angle to the axes of the preceding pair of rolls as shown in Fig. 2. The rolls of each pair or stand are so mounted in their housings that the points of bearings of the rolls on the billet will not be in a plane passing through the axes of the rolls, but are so arranged, one somewhat in advance of the other that planes passing through the axes of the rolls and at right angles to the line of feed of the billet, will be parallel to each other but will not coincide, as shown in Figs. 1 and 2. One roll of each pair should be arranged in advance of the other roll, to permit of the metal being displaced by the first roll not only along the mandrel but also transverse of the mandrel. By reference to Fig. 1 it will be seen that by the action of the roll $1^a$ which has a bite or bearing on the billet in the rear of the bite or bearing of the roll $1^b$, the billet is not only elongated but also enlarged transversely, and that in consequence of this transverse enlargement the portion of the wall of the billet opposite that on which the roll $1^a$ bears and in the rear of the bite or bearing of the roll $1^b$, is forced away from the mandrel as indicated at *a*. The roll $3^b$ which has its axis parallel with the axes of the rolls of the stand or pair A, will operate on the billet at a point diametrically opposite the point of bearing or bite of the roll $1^a$, but farther along the billet, and will produce an elongation and transverse enlargement of the billet. As the roll $3^a$ will prevent an extension of such enlargement forward, the portion of the wall of the billet on the side opposite that acted on by the roll $3^b$ and in front of the roll $3^a$, will be forced out of contact with the mandrel as indicated at *c*.

While for purposes of illustration the several lateral displacements *a*, *b*, *c*, etc., of the walls of the billet, are shown in Fig. 1 as occurring along two diametrically opposite sides of the billet and mandrel, the enlargements or displacements *b* and *c* effected by the rolls $2^b$ and $2^a$ will be ninety instead of one hundred and eighty degrees from the displacements or enlargements effected by the rolls $1^a$, and $3^b$, as the rolls $2^a$ and $2^b$ have their axes at right angles to the axes of the rolls $1^a$, $1^b$ and $3^a$, $3^b$.

In order to prevent the formation of fins the grooves in the several rolls are made of a depth greater than half the diameter of the billet at the points where the rolls operate.

In order to prevent excessive springing of the mandrel by reason of the points of bearing or bite of the rolls of each pair being out of line, the points of bite of the rolls of each pair should be separated a sufficient distance to permit of the desired enlargement and displacement of the walls of the billet, but at the same time prevent a material bending or springing of the mandrel.

When the horizontal distances between the axes of the pairs of rolls are equal as in the construction shown in Figs. 1, 1ª and 2, the areas of contact of the billet on the mandrel produced by the several rolls will be approximately equal. As the movement of the mandrel is due to the frictional engagement of the billet with the mandrel and as the areas of the billet thus in contact vary in speed, each having the speed of the roll producing such contact, the movement of the mandrel will be approximately that of the center of the combined areas of contact produced by the rolls.

It will be seen that although the grooves in the rolls are approximately circular, the off setting of one roll of each pair forms an oval pass, which although its plane is at an angle to line of movement of the billet and mandrel, will impart to the billet an oval shape, as shown in Figs. 3 and 4 and hence it is necessary to true the pipe or bring it to a circular form by a pair of rolls having circular passes and arranged with their axes in a common plane. It is preferred that this truing or finishing pair of rolls should form a part of the continuous mill as shown at 5 in Fig. 2.

It is characteristic of my improvement that each of the rolls while producing an elongation of a portion of the wall of the billet at the same time produces such an enlargement and displacement of the billet away from the mandrel, that the elongation and consequent movement along and independent of the mandrel can take place without material friction between the mandrel and billet.

I claim herein as my invention:

1. As an improvement in the art of rolling hollow billets on a mandrel, the method herein described which consists in passing a billet longitudinally through a series of rolls applying rolling reducing pressure to the billet at only one point in the same plane transverse of the axis of the billet thereby enlarging and elongating the billet, and permitting the metal of the billet at points outside that of applied pressure to move away from the mandrel.

2. As an improvement in the art of rolling hollow billets on a mandrel, the method herein described which consists in passing a billet longitudinally through a series of rolls applying rolling reducing pressure to the billet at a series of points along the same, no two points of pressure being in the same plane transverse of the axis of the billet and permitting the metal of the billet at points outside those of applied pressure to move away from the mandrel.

3. As an improvement in the art of rolling hollow billets on a mandrel, the method herein described which consists in passing a billet longitudinally through a series of rolls applying rolling reducing pressure to the billet at a series of points along and around the same, no two points of pressure being in the same planes transverse of the billet and permitting the metal of the billet at points outside those of applied pressure to move away from the mandrel.

4. As an improvement in the art of rolling hollow billets, the method herein described which consists in passing a billet longitudinally through a series of rolls simultaneously applying rolling reducing pressure to opposite sides of the billet, each point of applied pressure being in a plane transverse of the billet but outside of the plane passing through the outer points of pressure and permitting the metal of the billet at points opposite that of applied pressure to move away from the mandrel.

5. As an improvement in the art of rolling hollow billets on a mandrel, the method herein described, which consists in passing a billet inclosing a mandrel through a series of reducing rolls arranged to operate reductively on less than half of the circumference of the billet, and controlling the movement of the mandrel by the conjoint action of the areas of contact of the billet on the mandrel.

6. As an improvement in the art of rolling hollow billets on a mandrel, the method herein described which consists in passing a billet inclosing a mandrel through a series of reducing rolls having progressively increasing speeds and arranged to operate reductively on less than half of the circumference of the billet and causing the mandrel to move longitudinally at a rate less than the peripheral speed of the last pair of reducing rolls.

7. As an improvement in the art of rolling hollow billets on a mandrel, the method herein described, which consists in passing a billet inclosing a mandrel through a series of rolls having progressively increasing speeds, each pair of rolls forming between them oval passes, and causing the mandrel to move longitudinally at a rate equal to the average of the peripheral speeds of the reducing rolls.

In testimony whereof, I have hereunto set my hand.

OTTO BRIEDE.

Witnesses:
T. Hendy Reed,
A. Stolte.